United States Patent
Natsubori et al.

(10) Patent No.: US 7,450,818 B2
(45) Date of Patent: *Nov. 11, 2008

(54) APPARATUS FOR RECORDING DATA, METHOD FOR RECORDING DATA AND TELEVISION PROGRAM RECEIVER

(75) Inventors: Shigeyasu Natsubori, Yokohama (JP); Toru Imai, Futyu (JP); Toshiya Takahashi, Matsudo (JP); Shigeru Oyanagi, Yokohama (JP)

(73) Assignee: Kabsuhiki Kaisha Toshiba, Kawasaki-shi (JP)

( * ) Notice: Subject to any disclaimer, the term of this patent is extended or adjusted under 35 U.S.C. 154(b) by 673 days.

This patent is subject to a terminal disclaimer.

(21) Appl. No.: 10/461,677

(22) Filed: Jun. 16, 2003

(65) Prior Publication Data

US 2003/0210893 A1 Nov. 13, 2003

Related U.S. Application Data

(63) Continuation of application No. 09/353,140, filed on Jul. 14, 1999, now abandoned.

(30) Foreign Application Priority Data

Jul. 17, 1998 (JP) .................................. 10-203999

(51) Int. Cl.
H04N 5/91 (2006.01)

(52) U.S. Cl. .............................. 386/83; 386/125; 725/58

(58) Field of Classification Search ....................... 386/1, 386/45, 46, 83, 125, 126; 725/39–61, 141; 358/442, 468; 707/1, 2; 360/55, 69, 75
See application file for complete search history.

(56) References Cited

U.S. PATENT DOCUMENTS

| 5,481,702 | A | | 1/1996 | Takahashi |
| 5,488,409 | A | | 1/1996 | Yuen et al. |
| 5,850,218 | A | * | 12/1998 | LaJoie et al. ................... 725/45 |
| 5,877,906 | A | | 3/1999 | Nagasawa et al. |
| 6,118,920 | A | | 9/2000 | Sato |
| 6,166,778 | A | * | 12/2000 | Yamamoto et al. ............ 725/40 |
| 6,240,240 | B1 | | 5/2001 | Nagano et al. |
| 6,249,914 | B1 | | 6/2001 | Harrison et al. |
| 6,256,453 | B1 | * | 7/2001 | Takano ....................... 386/126 |
| 6,281,989 | B1 | * | 8/2001 | Tomida ....................... 358/442 |
| 6,341,278 | B1 | * | 1/2002 | Yamamoto et al. ............. 707/2 |
| 6,396,544 | B1 | * | 5/2002 | Schindler et al. .............. 725/53 |

FOREIGN PATENT DOCUMENTS

WO  WO 92/20188  11/1992

* cited by examiner

*Primary Examiner*—John W. Miller
*Assistant Examiner*—Christopher Onuaku
(74) *Attorney, Agent, or Firm*—Oblon, Spivak, McClelland, Maier & Neustadt, P.C.

(57) ABSTRACT

By using program information, the amount of which to be transmitted is not fixed, and related information which is related to the expected amount of the main information, an area for recording main information is ensured in advance on a recording medium. This ensures a reliable recording of a program, the recording of which has already been reserved, without affecting any program which has already been recorded. In addition, even when a change occurs in related information before or after the start of recording information on the recording medium, an area assigned before the start of the recording can be changed corresponding to related information after the change.

1 Claim, 7 Drawing Sheets

APPARATUS FOR RECORDING DATA, METHOD FOR RECORDING DATA AND TELEVISION PROGRAM RECEIVER

BACKGROUND OF THE INVENTION

1. Field of the Invention

The present invention relates to an apparatus and method for recording data which records digital or analog data such as broadcast programs, packaged software of musical CDs, or images or computer programs prepared by individuals.

2. Description of the Related Art

So far, when a user makes a reservation for the recording of a program to record a broadcast program using a video recorder, the person must carry out time setting using information from other media such as newspapers or magazines or using the EPG (Electronic Program Guide) which is put out by broadcasting stations for the convenience of users for the reservation using the automatic program recording. If the prolongation of reserved program is expected, the user must cope with the situation by setting an ending time as the time containing a maximum possible time for prolongation taken into consideration at the time of recording reservation.

In addition, the user must set a magnetic tape in a video recorder after visually confirming the remaining length of the magnetic tape, which is mainly used as the recording medium, and must decide whether recording of a desired program is possible on the remaining tape. Although some video recorders are provided with a warning function as to the amount of remaining tape at the time of recording reservation or a function for completing the recording of a reserved program by automatically lowering the grade of recording resolution when remaining capacity of a tape becomes short, still, it has been rather difficult to record a desired program completely when the broadcasting time of the program is changed or unexpectedly lengthened.

As a recording medium, disks which are capable of random access, such as CD-R or DVD-RAM, have lately attracted considerable attention. When time series data, such as video or audio, is recorded on such a disk capable of random access, data is recorded continuously from the beginning of the unused area toward the end after recorded data is reduced and unused capacity is confirmed beforehand using an authoring tool. For additional recording, data is also recorded in a similar manner.

Even when data is recorded on such a disk capable of random access, similarly to a case where recording is done on a tape, it is necessary to confirm the total amount of data before recording. For example, recording is presumed to be carried out after data to be recorded has been stored in another mass storage medium such as a magnetic disk unit. In a word, it was impossible to cope with circumstances such as reserved recording of a broadcast program, the data rate of which is variable and broadcasting time of which is changeable, or instantaneous recording which may stop recording any time.

OBJECTS AND SUMMARY OF THE INVENTION

It is an object of the present invention to provide an apparatus and method for recording data to enable a data recording apparatus using mainly a recording medium capable of random access to change flexibly an information recording area to be ensured on a recording medium corresponding to a change in related information on the amount of data of main information when it records information, such as program information of a television broadcast wherein the amount of information to be transmitted is not fixed.

It is another object of the present invention to provide an apparatus and a method for recording data to enable a data recording apparatus using mainly a recording medium capable of random access, when it records information such as program information of a television broadcast wherein the amount of information to be transmitted is not fixed, to ensure a recording area for recording the information once, and then, when the recording medium is exchanged before the start of recording, to ensure swiftly a recording area on a new recording medium.

It is another object of the present invention to provide an apparatus and method for recording data to enable a data recording apparatus using mainly a recording medium capable of random access to record flexibly and instantaneously without depending on related information.

It is a further object of the present invention to provide an apparatus and method for recording data which enables to reduce successively excess and deficiency of the recording area to be ensured corresponding to the amount of data to be actually received.

A data recording apparatus according to the present invention comprises an input means which takes in main information and related information which is related to the main information, an area ensuring means which ensures a vacant area for recording said main information based on said related information on a recording medium, and a recording means which records said inputted main information in the vacant area ensured on said recording medium.

A data recording apparatus according to the present invention comprises an input means which takes in main information and related information which is related to the main information, an area ensuring means which ensures a vacant area for recording said main information based on said related information on a recording medium, an area re-ensuring means which re-ensures a vacant area for recording said main information when the vacant area ensured on said recording medium by said area ensuring device becomes such that it is impossible to record said main information, and a recording means which records said main information inputted in the vacant area ensured on said recording medium.

A method of recording data of the present invention comprises the steps of taking in main information and related information which is related to the main information, ensuring a vacant area for recording said main information on a recording medium based on said related information, re-ensuring a vacant area for recording said main information when the vacant area, which is ensured on said recording medium, becomes unable to record said main information, and recording said inputted main information in the vacant area which is ensured on said recording medium.

Other features and advantages of the present invention will become more apparent from the following description.

DETAILED DESCRIPTION OF THE PREFERRED EMBODIMENTS

The present invention will now be described with reference to the accompanying drawings which illustrate embodiments of the present invention.

Figure 1:
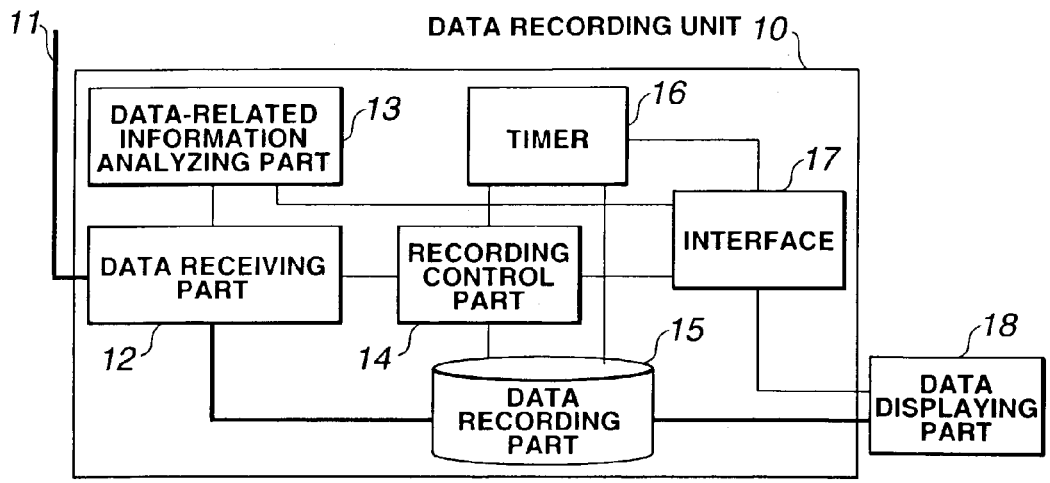
FIG. 1 is a diagram showing the whole configuration of a data recording apparatus according to an embodiment.
Figure 2:
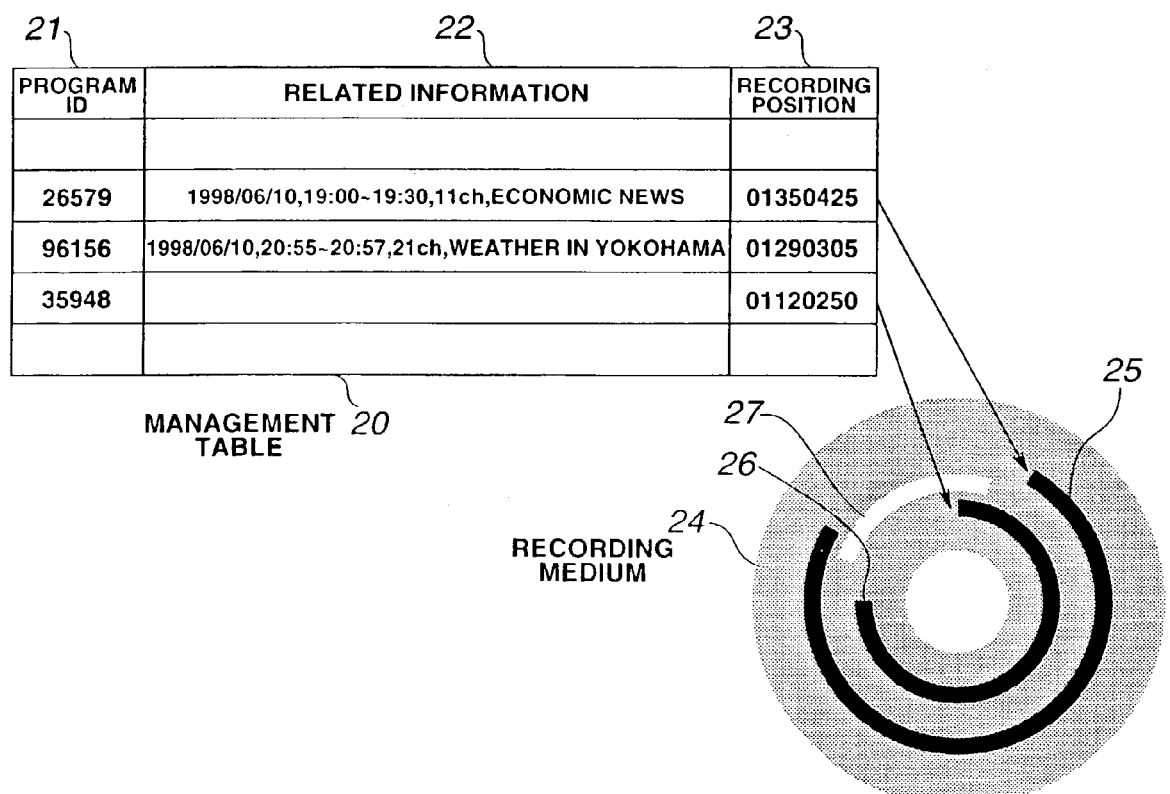
FIG. 2 shows a program management table and a schematic diagram illustrating recording positions on a recording medium corresponding to this table.

FIG. 1 is a diagram showing the whole configuration of a data recording unit 10 according to an embodiment. FIG. 2 shows a program management table and a schematic diagram of a recording medium corresponding to this table.

As shown in FIG. 1, the data recording unit 10 receives objective data for recording (main information) such as broadcast programs, packaged software of musical CD, or images prepared by individuals, transmitted through a data transmission path 11 from outside. The data recording unit 10 also has a data receiving part 12 for receiving data-related information related to objective data for recording, a data-related information analyzing part 13 for analyzing data-related information received at the data receiving part 12, a data recording part 15 for recording transmitted data on a recording medium, such as a disk which is capable of random access, a recording control part 14 for controlling recording operation of the data recording part 15, a timer 16, an interface 17 and a data displaying part 18.

The data-related information analyzing part 13, when a broadcast program is objective data for recording, analyzes, out of the data-related information of a received broadcast program, such items as the program's information producer and a program list of a television broadcast. When a user reserves a desired program, the data-related information analyzing part 13 issues reserved information based on the analyzed result of data-related information.

The reserved information is supplied to the recording control part 14 through the interface 17. The interface 17 generates display data for a display based on the reserved information and supplies data to the data displaying part 18. The data displaying part 18 gives a display based on the reserved information. The user can reserve referring to the display based on the reserved information. A signal corresponding to the user's reserving operation is given to the interface 17, and the interface 17 issues a demand for a reservation based on the reserving operation and reserved information corresponding to it. The demand for the reservation of a desired program from the interface 17 is supplied to the recording control part 14.

The recording control part 14, when it receives a demand for reservation, issues a program identifier for the reserved program. The program identifier is uniquely identifiable in the data recording unit, or in a given physical or logical scope which comprises the data recording unit, or is absolutely identifiable. Some examples of program identifiers are shown in FIG. 2 in a program ID column 21 of a management table 20, "26579", "96156" and "35948".

Moreover, the recording control part 14, when it receives a demand for reservation, compares the capacity of the area necessary for recording program information, which is designated for recording by the demand for a reservation, with a capacity of continuous or dispersed recording area on a recording medium which exists in the data recording part 15 at that point of time, and decides possibility for the recording of the program information.

At this stage, the capacity of an area required for recording the program information is determined, for example, as resolution or bit capacity per unit time when the information is images. The recording control part 14 can calculate the area capacity necessary for recording the program information using a function of resolution of the reserved program, which is designated by a demand for reservation, in the recording mode or average or maximum value of data transfer rate and the time of duration of the reserved program. Such information is contained in the data-related information of the received broadcast program. The recording control part 14 is given such information by the demand for a reservation and calculates the capacity necessary for recording.

Under certain circumstances, data-related information may also contain the total amount of data of the program information to be transmitted, the amount of data in the physical or logical unit, and the time of duration of the program. In this case, the recording control part 14 can directly use such information transmitted.

The capacity can also be calculated using a function of the data rate designated by the user at will and the time of duration of the reserved program, or using a function of automatically set conditions and the time of duration of the reserved program.

The recording control part 14, when it decides that recording of a reserved program on a recording medium is possible, sends back to the interface 17 information to the effect that recording is possible. When it decides that recording is impossible, it sends back to the interface 17 information that recording is impossible. The interface 17, receiving this information, informs the user of the result by, for example, displaying the result on the data displaying part 18.

The recording control part 14, when it decides that a reserved program can be recorded on a recording medium, ensures an area for recording the reserved program temporarily or actually in a continuous or dispersed recording area on one or a plurality of recording media existing in the data recording part 15. When an area for recording a reserved program is temporarily ensured on a recording medium, the user can actually ensure the recording area, which has been temporarily ensured, by carrying out a predetermined operation for confirming reservation, after receiving information that recording is possible. If the user intends to actually ensure an area for recording a reserved program on a recording medium but has not carried out the operation for confirming reservation after receiving information that recording is possible, actual ensuring of the recording area is canceled.

Temporary or actual ensuring of a recording area in this stage is virtually carried out by the recording control part 14, which manages the data recording part 15, using variables which show the state of the recording medium existing in the data recording part 15. Or, ensuring of a recording area is also realized by changing attribute of one or a plurality of designators, which indicate the position at which the recording medium exists in the data recording part 15, from "vacant" state to "ensured" state. It can also be realized by writing virtual data expressing an "ensured" state onto one or a plurality of recording media of the data recording part 15. Or, these methods may be used in an assorted manner.

The recording control part 14 encloses in a memory, which is not shown, the relation of a program identifier issued at the time of program reservation to a recording area ensured corresponding to it, and the relation of this program identifier to program information corresponding to it as a management table.

The recording control part 14 can enclose a management table in an optional managing device in the data recording unit 10. A managing device is a physical or logical functional component and exists in said data recording unit solely or as a plurality of dispersed functional elements. The recording control part 14 may also store the management table in a memory of another unit connected with a network which is not shown.

Further, the recording control part 14 may be designed so that, when a recording medium is exchangeable, a management table is transferred to and stored on a recording medium where recording is finished when the recording medium is removed.

The management table 20 in a managing device, as shown in FIG. 2, is formed with the following elements, the program ID 21, related information 22 and a recorded position 23. The recording medium 24 is a disk-like recording medium having a data recording track in the form of a concentric circle. A position is indicated using a track number. The recording area corresponding to program ID "26579" (recording track 25) is ensured as an actual area because confirmation of recording has been completed. A recorded position, shown as "01350425", is composed of three elements, a medium number "01", a starting track "350" and an ending track "425". The table of program ID "35948" is in the middle of the course with only issuance of program ID and inspection of the recording area finished. The area ensuring the recording track 26 is in a temporary state and the management table 20 is in an incomplete state. The recording track 27 is one of the vacant areas.

Information on confirmed reservation is transmitted to the timer 16. The timer 16 gets ready for starting the recording operation at the time to receive the program data based on reserved information. The timer 16 sets the data recording part 15 as an output destination of the data receiving part 12 at a given time before the starting time of the program so that the data recording part 15 starts recording the program information received by the data receiving part 12 at the time to receive program data based on reserved information. And preparations are made, by a given time before the starting time of a program, for recording data in an area ensured on a recording medium of the data recording part 15 so that recording of data outputted from the data receiving part 12 is started at the starting time of a program.

Now, if the time when a program reservation procedure is completed and the time when recording of a reserved program starts are the same, or, if the time when a program reservation procedure is completed is later than the time when recording of the reserved program starts, or when recording of a program is started directly without a program reservation procedure, such recording will be referred to as "instantaneous recording".

When this instantaneous recording is carried out, and when the data-related information analyzing part 13 analyzes program-related information such as a producer of program information or a program list of a television broadcast, the recording control part 14, on receiving a demand for reservation based on this program-related information, issues a program identifier for the reserved program and such management information is recorded in a management table. When no program-related information is available, the recording control part 14 generates program-related information, which has a unique meaning physically or logically in said unit, and issues a program identifier for the reserved program. And management information, such as a starting time and a channel, is recorded into management information of the management table.

When program-related information is obtained, in a similar manner to that described above, the recording control part 14 compares the capacity of the area necessary for recording the program information indicated by a demand for reservation with the capacity of a continuous or dispersed recording area on a recording medium existing in the data recording part 15 at the point of time, and decides whether the program information can possibly be recorded on the recording medium. When the recording control part 14 decides that recording of the reserved program on the recording medium is possible, it returns to the interface 17 information that recording is possible, and also ensures temporarily or actually an area for recording the reserved program in a continuous or dispersed recording area on one or a plurality of recording media existing in the data recording part 15.

Now, a data recording apparatus according to an embodiment is also capable of carrying out instantaneous recording without depending on program-related information. In this case, when the only recording area ensured on a recording medium has a capacity of less than a previously set threshold, it returns information that recording is impossible. For example, when a capacity of dispersed vacant areas is converted into a recording time in a continuous maximum area to show that it is less than 5%, it deals this state as a case where no vacant area exists. When the only area ensured is dispersed on a recording medium, for some recording medium or a driving unit having limited performance, it is desirable to move an area where other data have been recorded to another area so as to ensure an area as continuous as possible for each program.

Figure 3:
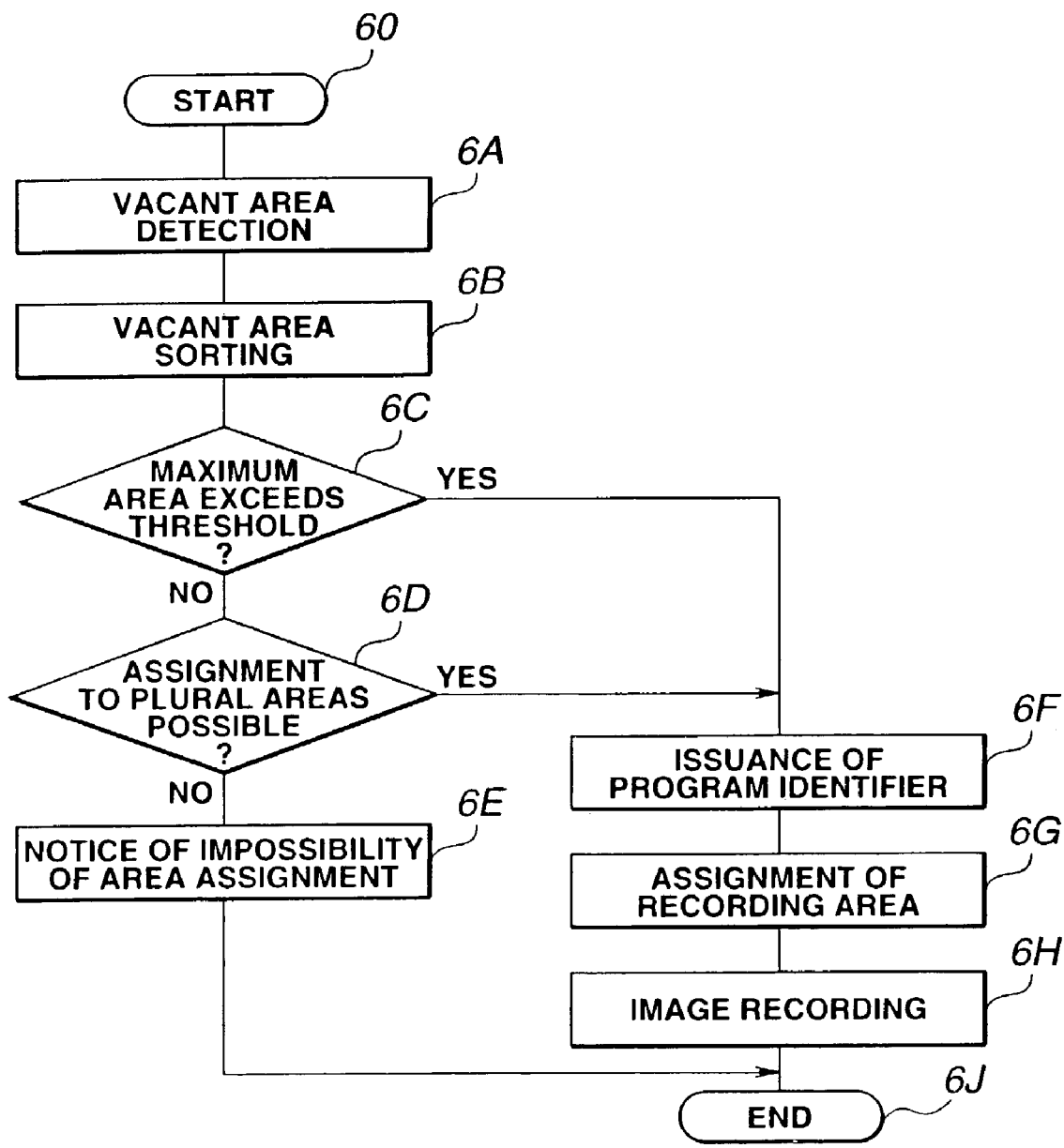
FIG. 3 is a flow chart illustrating operation procedures for instantaneous image recording.

Next, operation of instantaneous recording will be described with reference to the flow chart shown in FIG. 3.

When an instruction is issued for starting instantaneous recording (60), the recording control part 14 retrieves a vacant area (a continuous vacant area) on a recording medium (6A). When a plurality of vacant areas are retrieved, the recording control part 14 makes a list of these plurality of vacant areas retrieved in order of the area size (6B), and compares the maximum area among them with a value of a previously determined minimum area (threshold) (6C). The recording control part 14, when the maximum area is less than the threshold, decides whether ensuring areas over a plurality of areas is possible or not according to a previously set standard (6D). When ensuring is impossible, the recording control part 14 informs the interface 17 of the decision (6E) and ends the process without recording (6J).

When ensuring of an area over a plurality of areas is possible, the recording control part 14 issues a program identifier (6F), assigns one or a plurality of areas as a recording area at the time of instantaneous recording (6G), and starts recording (6H). When an instruction for a stop is issued by the user or from another unit, or when recording of a whole program into an ensured recording area is completed, the operation of instantaneous recording ends (6J).

A data recording apparatus according to an embodiment is, when a recording medium exchanged before the recording of a program onto the recording medium is started, and is further capable of re-assigning a recording area on a new recording medium after the exchange. That is, when a recording medium is physically or logically removed from the data recording part 15 after reservation is confirmed, information, which is related to procedures taken at the time of reservation confirmation such as ensuring of recording area for a reserved program or enclosing of program-related information (reservation-related information), is stored in the following manner; in this data recording unit, other managing device, or on one recording media of the data recording part 15 or on a plurality of them. For example, reservation-related information is stored in a memory, which is not shown, in the recording control part 14. Processes such as re-assignment of a recording area or saving of reservation-related information are designed to be carried out by the recording control part 14.

Reservation-related information is saved until a reserved program is completed. At this time, if imaginary data showing an ensured recording area exist on a recording medium, the recording control part 14 changes the imaginary data into a vacant area. If a new recording medium is set in the data recording part 15 during this time, re-ensuring an area for this new recording medium is carried out based on saved reservation-related information. In this case, if the newly set recording medium has the same structure, a vacant area of the same size at the same position as the recording medium which was removed before had, the recording control part 14 ensures the same area as that ensured on the former recording medium. In case a newly set recording medium has structure different from that of the recording medium which has already been ejected, or has the same structure but a different vacant area, the recording control part 14 ensures a recording area in a similar manner to ordinary reservation procedures.

Figure 4:
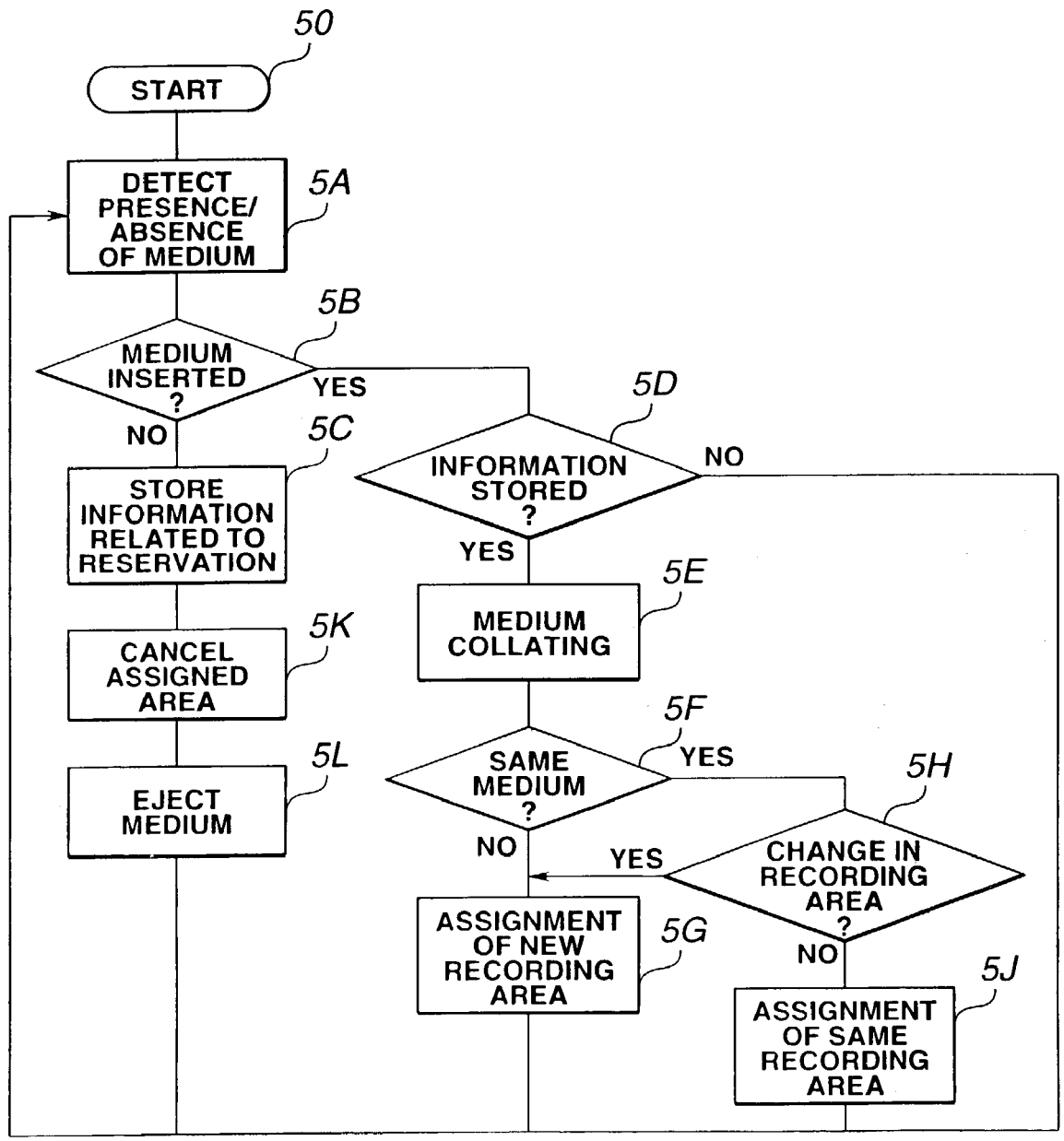
FIG. 4 is a flow chart illustrating a process for storing information related to reservation at the time while a recording medium is ejected.

Now, a description will be given for operation of saving reservation-related information in a data recording unit while a recording medium is removed with reference to the flow chart shown in FIG. 4.

Detection of the presence/absence of a recording medium is carried out being connected with a driving part of the medium (5A). When a demand for absence of a recording medium is detected (5B), information that program information, recording of which on a recording medium has been scheduled, is unrecorded on the recording medium and the absent recording medium is retained in, for example, a memory, which is not shown, of the recording control part 14, and reservation-related information is also stored (5C). Then, the recording control part 14 cancels one area which has been ensured on the recording medium (5K), and the recording medium is actually ejected (5L).

When insertion of a medium is detected (5B), the recording control part 14 examines existence of the recording medium which is in an unrecorded and ejected state (5D). If there is no recording medium which is in an unrecorded and ejected state, the process goes back to detection of presence/absence of a recording medium (5A). When there is a recording medium which is in an unrecorded and ejected state, the recording control part 14 examines whether the inserted recording medium is a medium having the same structure as that of the ejected recording medium (5E). If it has the same structure, a vacant area of the same size at the same position, that is, when it is the ejected recording medium itself (5H), the area ensured on the ejected recording medium is ensured as it is on the newly inserted recording medium (5J). When a recording medium is detected to have structure different from that of the ejected recording medium, or to have the same structure but no vacant area of the same size at the same position as the ejected recording medium had, the recording control part 14 ensures a recording area anew based on retained reservation-related information on the inserted new recording medium (5G).

Now, a description will be given for operation, after a program reservation and before the start of recording, where a change occurs in data-related information or in a user's demand for image recording.

A likely case is one in which an area ensured through the program reserving procedure becomes insufficient for recording all information due to an increase in total amount of data of program information caused by the prolongation of a broadcast program based on data-related information from the data-related information analyzing part 13, or by a change in a user's demand for recording. In this case, if the change is made before the start of program recording, the recording control part 14 re-ensures a recording area by enlarging the area assigned beforehand on a recording medium of the data recording part 15 or searching for an area to move to in an area other than the recording area ensured beforehand on the recording medium. When the change is made after the start of program recording, the recording control part 14 adds a recording area to be continued after the data recording area assigned before or an independent area, and, when this added area is continuous from the original data recording area, re-defines these areas as one data recording area. If these areas are not continuous, dispersed recording areas are defined as a recording area for dealing with information on one program.

Such a new area may also be ensured as continuous as possible by moving existing recording data.

If the ensuring of a newly assigned area is impossible, the recording control part 14 may, at the time when a change is made in program-related information, either inform a user or others through the interface 17 that complete recording of a program is impossible, or record a reserved program based on program-related information and discontinue recording at time when the recording area ensured beforehand is filled up.

Figure 5:
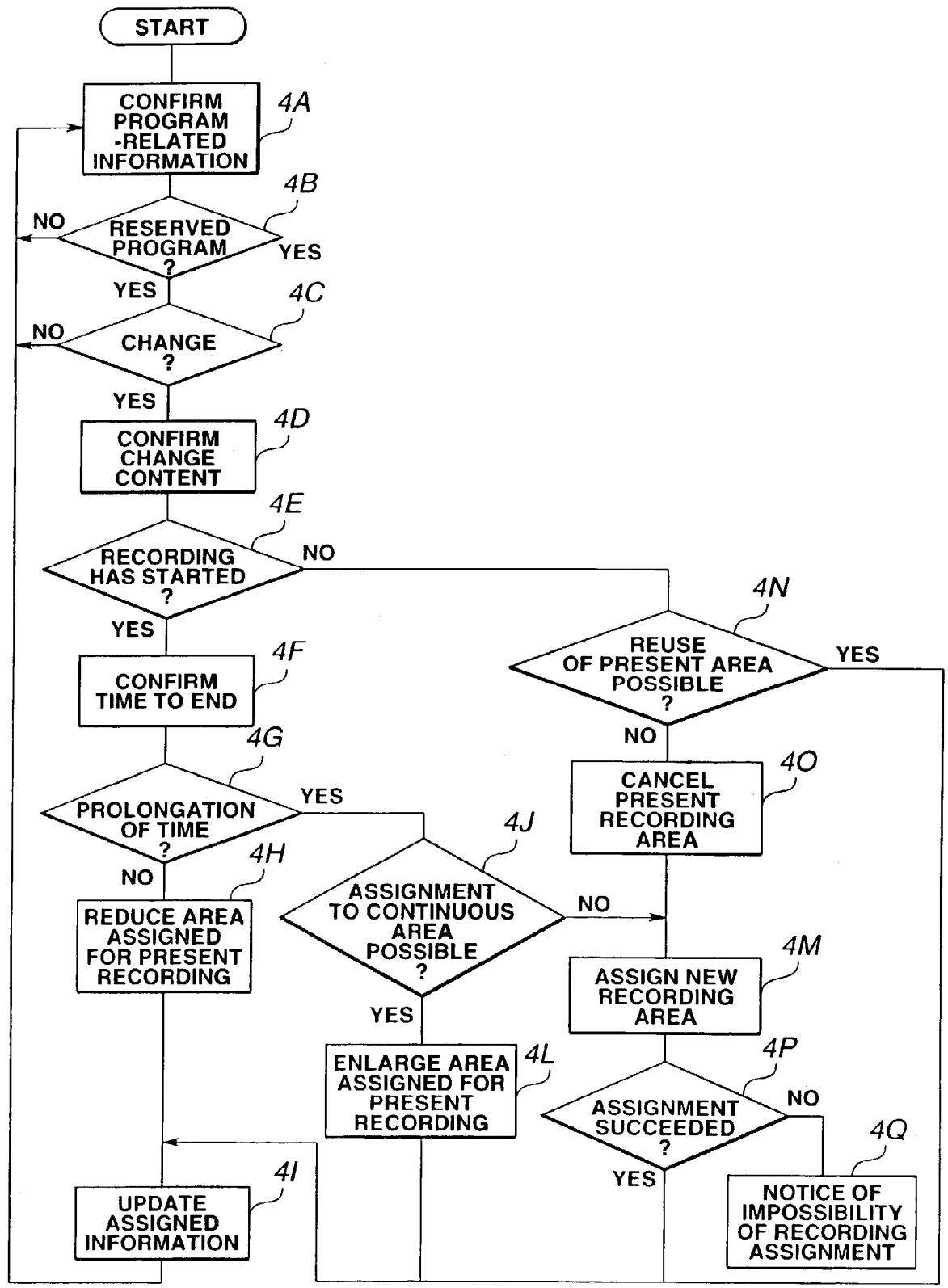
FIG. 5 is a flow chart illustrating a procedure for re-ensuring a recording area at the time when related information is changed.

The next description is given on operation when a recording area is re-ensured corresponding to a change in related information, such as the ending time of a program, with reference to the flow chart shown in FIG. 5.

The data-related information analyzing part 13 confirms received data-related information at every given period of time (4A). The data-related information analyzing part 13 decides whether the received data-related information is that of a program which has been reserved (4B). When the data-related information is of the reserved program but there is a change in its content (4C), the changed content is confirmed (4D). At this time, the data-related information analyzing part 13 decides whether the information is related to the program, recording of which has started (4E), and, if it is, confirms its ending time (4F). The ending time is confirmed (4G). If the ending time is advanced, the data-related information analyzing part 13 informs the recording control part 14 of the result to cause it to reduce the recording area assigned at present corresponding to the reduced time (4H) and to define the assigned recording area after the change as a program recording area (4I).

When prolongation of recording time is required, the recording control part 14 decides whether it is possible to assign a recording area for a prolonged time in a recording area continuing to the recording area assigned at present (4J), and, if it is possible, re-ensures an area with a recording area for the prolonged time added (4l). When it is impossible, the recording control part 14 takes steps to assign one or a plurality of recording areas independent of the present recording area (4M). Then, the recording control part 14 decides whether the assignment of the new area has succeeded (4P), and, if it has, re-ensures a series of originally assigned areas and newly assigned areas as recording areas for a reserved program (4l). When the assignment of a new area is unsuccessful, the recording control part 14 informs the user through the interface 17 that re-ensuring of an area is impossible.

When a change in the ending time of a program is found before the start of recording, the recording control part 14 decides whether the change can be absorbed within the area assigned at present (4N), and, if it is possible, updates program-related information related to the area assigned at present (4I). If the area assigned at present cannot cope with the change in the program ending time, the recording control part 14 cancels the originally assigned area once (4O) and takes steps to assign a new recording area (4M). Then, the recording control part 14 decides whether assignment of the new recording area is successful (4P), and, if so, re-ensures a series of originally assigned areas and newly assigned areas as recording areas for a reserved program (4I). When assignment of a new area fails, the recording control part 14 informs the user through the interface 17 that re-ensuring of the area is impossible.

Figure 6:
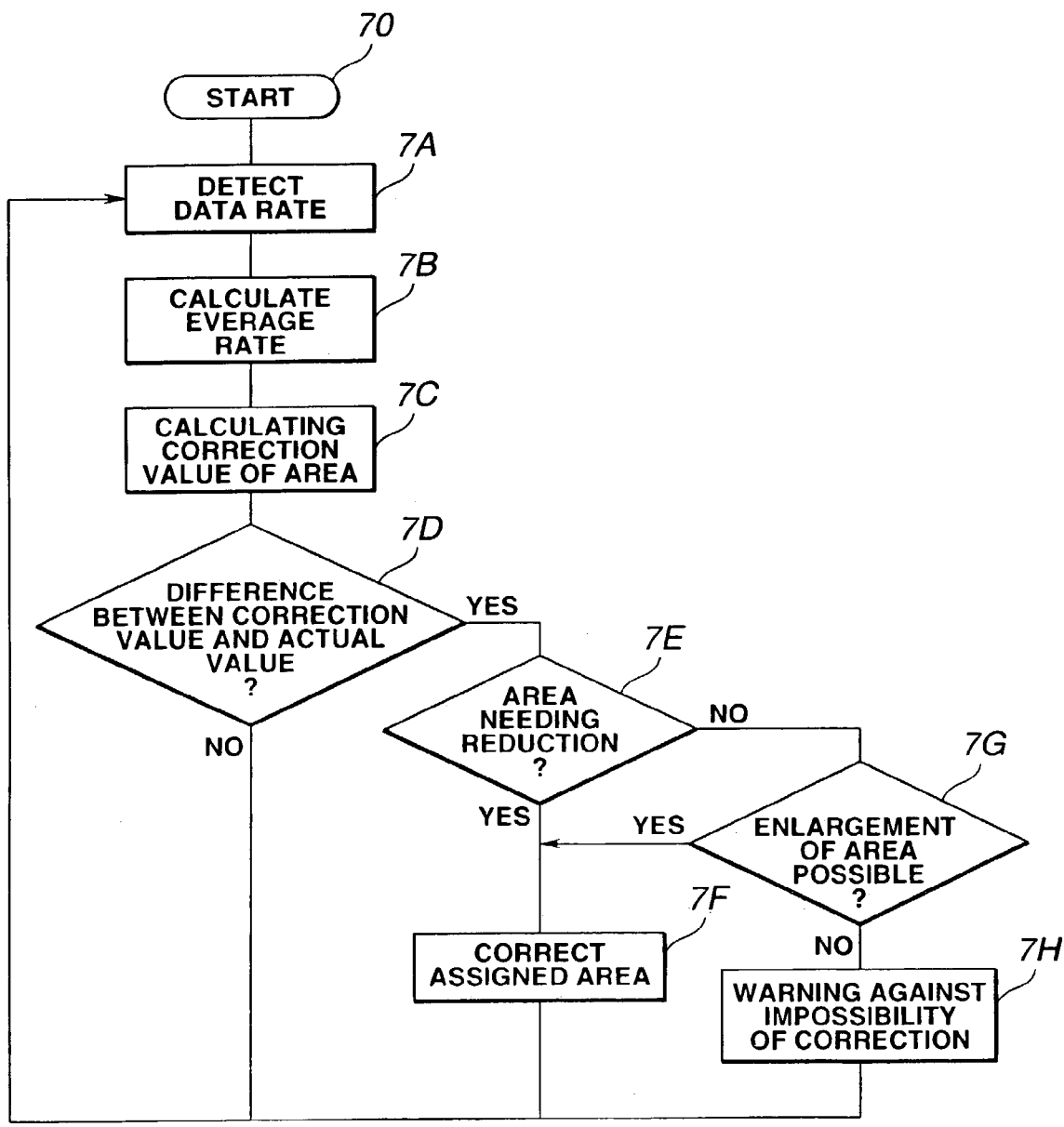
FIG. 6 is a flow chart illustrating a procedure for changing a recording area in consideration of the amount of data to be actually received.

Now, a description will be given with reference to the flow chart shown in FIG. 6 on operation when a recording area is periodically enlarged or reduced during recording of a program corresponding to the amount of received program information per unit time.

The recording control part 14, once recording is started, measures the amount of data Ri of recorded data per a short time at every given time (7A) and calculates the average amount of data Rm measured since immediately after the start of recording (7B), then, calculates corrected assigned area Sc using a function of the average amount of data Rm and a time which is scheduled for recording (7C). The recording control part 14 decides whether there is a difference between the area assigned at present Sp and the corrected assigned area Sc (7D), and, if the values are the same, goes back again to detection of data rate (7A). When there is a difference and the corrected assigned area Sc is smaller than the area assigned at present Sp, that is, the area needs reduction, a corrected area is assigned based on a predetermined formula using a value of the corrected assigned area Sc (7F).

If there is a difference and the corrected assigned area Sc is larger than the area assigned at present Sp, the recording control part 14 detects whether enlarging an area which is equivalent to the value of the corrected assigned area Sc is possible (7G), and, if it is, assigns, using the value of the corrected assigned area Sc, a corrected area according to a predetermined formula (7F). If it is impossible, the recording control part 14 issues a warning about the impossibility of area correction (7H) and goes back to detection of data rate (7A) again. At this time, the reason why just a warning is issued without more steps is that there is a possibility of an area's being reduced at the time of next area correction. When the warning is received, it depends on the user or other control means of the unit to decide whether area correction is to be carried out or not.

The timer 16, at the ending time of a program, directs the data recording part 15 to stop recording and the data receiving part 12 to stop outputting data to the data recording part 15. When a halt is directed, between the starting time of data recording and its ending time based on this program information, by a user or other operating means of the unit through the interface 17, the data recording part 15 stops temporarily recording this data. In this state where recording is temporarily stopped, the state of temporary stop is discontinued and recording is resumed when, for example, a direction for a halt is issued again by the user through the interface 17, when a direction for recording is issued by the user through the interface 17, or when another direction for a halt or a direction for recording is issued because a previously defined limit time of temporary stop is over.

Recording of a program is completed by the recording control part 14's directing the data recording part 15 to stop at the ending time of a program based on program information. At this time when recording of a program is completed, a direction is issued so that program-related information, which is represented by information used for program reservation, is recorded in an area succeeding a data recording area or in an independent area on a recording medium. Program-related information may be recorded at an optional time, which does not depend on a program recording time, in so far as it is done after a program reservation procedure was completed.

Figure 7:
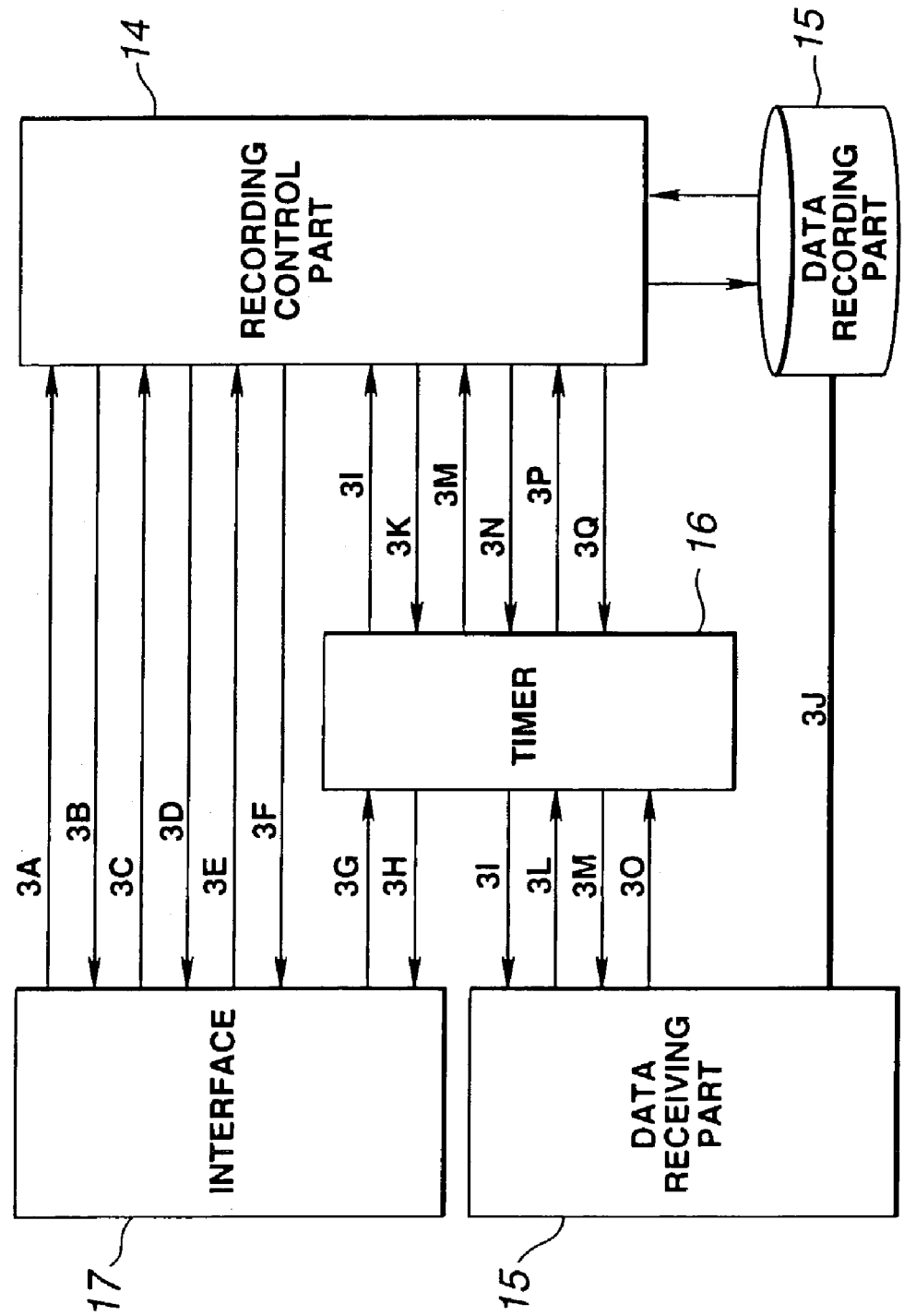
FIG. 7 is a diagram illustrating operation procedures from program reservation to recording carried out by a data recording apparatus according to an embodiment.

The next description will be given on procedures of operation, from program reservation to recording, by this data recording unit with reference to FIG. 7.

First, a control instruction is issued by a user or other unit through the interface 17. Now, suppose that information for setting, information such as a physical or logical unit of data reserving of which is desired, that is, a broadcast program and/or others, is obtained beforehand from different media such as EPG.

A description will now be given on a procedure for communication control signals by the interface 17, the recording control part 14, the data recording part 15, the timer 16 and the data receiving part 12, and also on operation for recording reservation data.

Through the interface 17, a user or other unit requires the recording control part 14 to examine quality of data to support, and vacant capacity on a recording medium (3A). Examined results on the quality of data to support, vacant capacity on a recording medium are returned to the interface 17 by the recording control part 14 (3B). An identifier for new reservation data, that is, a new program ID is demanded of the recording control part 14 through the interface 17 (3C).

The recording control part 14 returns an identifier for new reservation data, that is, a new program ID which is unique in at least this data recording unit (3D). A reservation for a data recording area on a recording medium of the data recording part 15 is demanded, designating an identifier for reservation data and a recording size of reservation data (3E). The recording control part 14 answers whether it has successfully reserved the data recording area on the recording medium (3F). A data recording reservation is made to the timer 16 through the interface 17 (3G). Whether the data recording reservation is made properly or not is returned to the interface 17 (3H). According to the data recording reservation, the timer 16 makes a recording demand of the recording control part 14 and the data receiving part 12 at the starting time of the recording (3I).

The data receiving part 12 transmits data corresponding to the reserved contents to the data transmission path 11, and the recording control part 14 starts recording data in the data transmission path 11 in a recording area of the data recording part 15 (3J). An answer is given on whether the receiving of data was done properly at the recording control part 14 (3K). An answer is given on whether the sending of data was done properly at the data receiving part 12 (3L). According to a reservation for data recording, the timer 16 makes a demand for stopping data recording the recording control part 14 and of the data receiving part 12 at the stopping time of data recording (3M). An answer is given on whether the receiving of data was stopped properly at the recording control part 14 (3N). An answer is given on whether sending of data was stopped properly at the data receiving part 12 (3O). Recording of related information of the reservation data is done to the recording control part 14 (3P). An answer is given on whether recording of information related to the reservation data was done properly (3Q).

Figure 8:
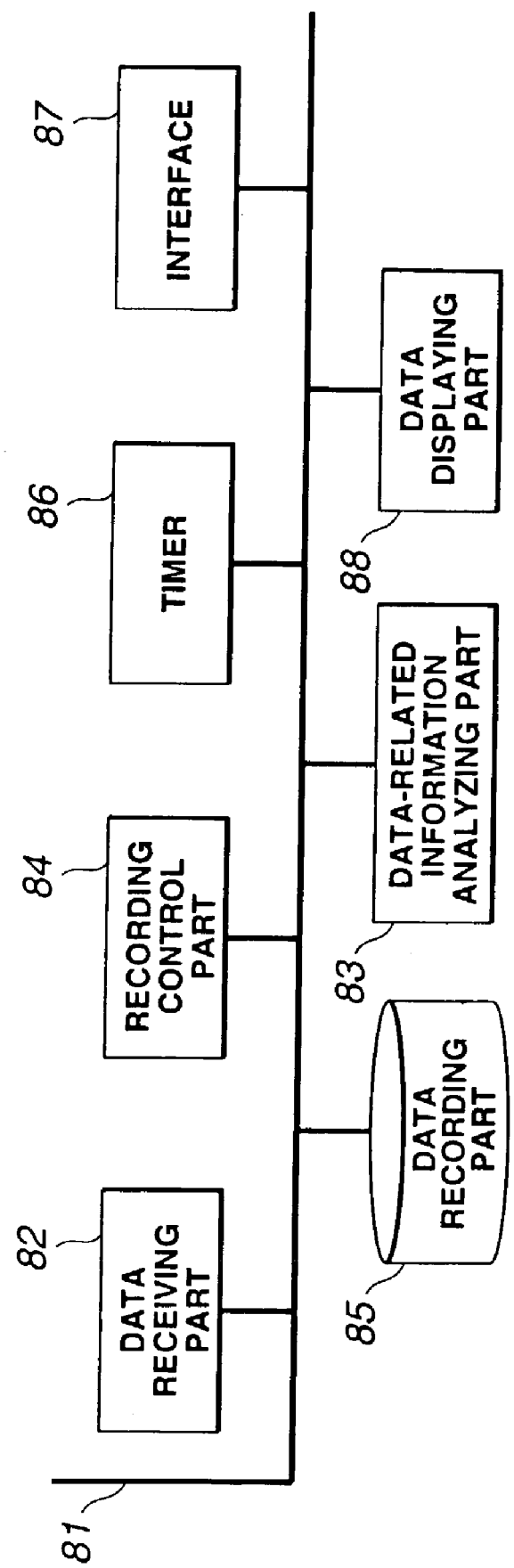
FIG. 8 is a diagram showing a modified example of a data recording apparatus according to an embodiment.

FIG. 8 shows a modified example of a data recording apparatus according to an embodiment. In this example, each functional module is configured as an independent unit respectively, and each unit is connected mutually by a network. All of content data such as program data or program-related information and control data, which are mutually given and taken among each of functional modules, are communicated either through the network, which connects each module, or through different networks respectively.

In this manner, this embodiment enables flexible changes in an information recording area to be ensured on a recording medium corresponding to changes in related-information related to the amount of main information. In addition, it enables flexible changes in an information recording area to be ensured on a recording medium corresponding to changes in related-information related to the amount of main information even after recording was started. Moreover, it enables flexible changes even in a recording area, which is ensured based on related information, corresponding to changes in this related information caused later. It also enables flexible changes, even after recording of information has been started, in a recording area, which is ensured based on related information, corresponding to changes in related information caused afterwards. Further, when a recording medium is inserted or ejected after a recording area is ensured and before recording is started, a recording area can be automatically ensured again on the newly inserted recording medium. Still more, the recording area can be effectively adjusted by dynamic adjustment of recording area considering the amount of data to be received actually. Still furthermore, it enables flexible instantaneous recording which does not depend on related information.

It is obvious that the present invention is able to become the basis of configuration for different aspects of embodiments in a wide scope without any departure from the spirit and scope of the invention. The present invention should not be limited, except by the appended claims, only to these embodiments.

What is claimed is:

1. A data recording apparatus comprising:
a receiving part configured to receive program information and information related to the program information;
a first deciding part configured to decide whether or not the program information can be recorded on a recording medium based on the related information;
a first ensuring part configured to, when it is decided that the program information can be recorded on the recording medium, ensure a first area for recording the program information on the recording medium;
a second deciding part configured to decide whether or not a second area contiguous to the first area can be ensured to record an increase in a total data size of the program information when, after recording the program information on the recording medium has been started and a total data amount of the program information to be recorded on the recording medium has increased, the first area can not entirely store the program information;
a second ensuring part configured to ensure the second area when it is decided that the second area can record the increase in the total data size of the program information;
a third ensuring part configured to ensure a third area independent from the first area when it is not decided that the second area can record the increase in the total data size of the program information;
a recording part configured to record the received program information on the first and second areas or on the first and third areas ensured on the recording medium based on the decision of the second deciding part; and
moving means for, when it is decided that the second area cannot record the increase in the total data size of the program information, moving other information already stored in an area contiguous from the first area to another area on the recording medium,
wherein the second ensuring part ensures the contiguous area as the second area.

* * * * *

UNITED STATES PATENT AND TRADEMARK OFFICE
CERTIFICATE OF CORRECTION

PATENT NO.         : 7,450,818 B2                                         Page 1 of 1
APPLICATION NO. : 10/461677
DATED              : November 11, 2008
INVENTOR(S)       : Natsubori et al.

It is certified that error appears in the above-identified patent and that said Letters Patent is hereby corrected as shown below:

On the title page, the Terminal Disclaimer information should be removed. Item (45) and the Notice information should read as follows:

Title Page; should read;

-- (45) Date of Patent: Nov. 11, 2008

(*) Notice:     Subject to any disclaimer, the term of this patent is extended or adjusted under 35 U.S.C. 154(b) by 673 days. --

Signed and Sealed this

Third Day of February, 2009

JOHN DOLL
*Acting Director of the United States Patent and Trademark Office*